(No Model.)
L. DURAND.
DOUGH KNEADER.
No. 493,074. Patented Mar. 7, 1893.
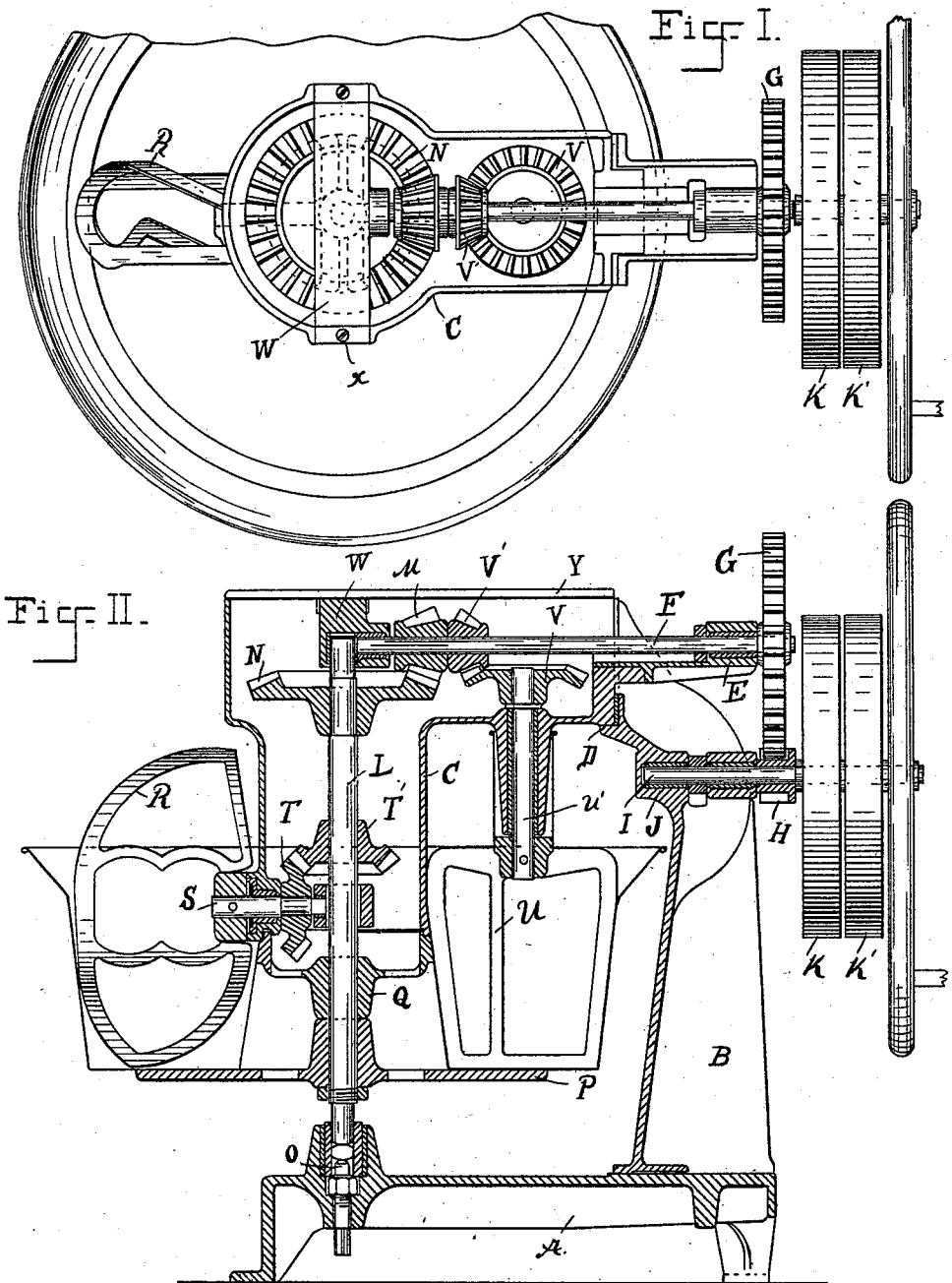
Witnesses
Lillie Hanna
Chas. W. Thomas
Inventor
Louis Durand
per Rucker Bros
attys

UNITED STATES PATENT OFFICE.

LOUIS DURAND, OF NEW YORK, N. Y.

DOUGH-KNEADER.

SPECIFICATION forming part of Letters Patent No. 493,074, dated March 7, 1893.

Application filed April 2, 1892. Serial No. 427,500. (No model.)

*To all whom it may concern:*

Be it known that I, LOUIS DURAND, a citizen of the United States, residing at New York city, New York, have invented certain new and useful Improvements in Dough-Kneaders, of which the following is a specification.

My present invention relates to a construction of dough kneaders peculiarly adapted to be applied to dough kneaders of large size, that is to say, dough kneaders of one barrel capacity or thereabout.

I have found by long usage of machines substantially of the size named, that the details of my present invention are particularly applicable therefor. The construction referred to is disclosed in the accompanying drawings, which form a part of this specification, and in which Figure I represents a plan view and Fig. II a vertical section of my improved dough kneading machine.

In the drawings A represents a bed-plate and B a support or standard rising therefrom and at one side thereof.

C is a frame work or casing which seats upon the standard B, at a point D. This casing C extends outwardly as shown at E, and provides a journaled bearing for the horizontal shaft F. This horizontal shaft F is provided with a large gear-wheel G, meshing with a small gear-wheel H upon the horizontal shaft I. The horizontal shaft I is journaled in the standard B at J, and is provided at its outer end with fixed and idler belt-wheels K, K'. The horizontal shaft F connects with and operates the vertical driving and supporting shaft L, through the medium of bevel gear M and N. This vertical shaft L, turns upon and is supported by the adjustable pivot point O, in the bed-plate A, the parts being so arranged that the said vertical shaft can be adjusted together with the parts which it carries, to wit: the kneading pan P which in turn supports the casing C, through the medium of bridge-plate Q. The casing supports the kneader R, which is attached to and operated by the horizontal shaft S, journaled in said casing, the said shaft being provided with a bevel gear-wheel T, meshing with a corresponding bevel gear-wheel T' upon the vertical shaft L. The stirrer is shown at U, and has a vertical shaft U' and is provided with a bevel gear-wheel V, which meshes with and is adapted to be rotated by a corresponding bevel gear-wheel V' upon the horizontal shaft F.

The inner end of the horizontal shaft F, and the upper end of the vertical shaft L, are journaled in and held in a central position by the bridge piece W, which extends between and is attached to the sides of the casing C, by means of screws X.

The cap or cover of the machine is shown at Y, which cover rests upon the bridge piece W and the upper edges of the casing, thus inclosing and covering it.

Having thus described my invention, the following is what I claim as new therein and desire to secure by Letters Patent:

The combination, in a dough kneading machine, substantially as hereinbefore described, of the bed plate A, the standard B rising therefrom and at one side thereof and provided with a journal bearing J, a shaft I having gearing H, a casing C having journal bearing E, a shaft F having gear wheel G, vertical shaft L, a kneading pan with a beater and stirrer arranged therein and bevel gearing T, T', M, N, V, V' all arranged substantially as and for the purposes set forth.

LOUIS DURAND.

Witnesses:
HERBERT KNIGHT,
M. V. BIDGOOD.